United States Patent
Perng et al.

(10) Patent No.: US 7,724,784 B2
(45) Date of Patent: May 25, 2010

(54) SYSTEM AND METHOD FOR CLASSIFYING DATA STREAMS USING HIGH-ORDER MODELS

(75) Inventors: Chang-Shing Perng, Goldens Bridge, NY (US); Haixun Wang, Irvington, NY (US); Jian Yin, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 11/520,529

(22) Filed: Sep. 13, 2006

(65) Prior Publication Data

US 2008/0126556 A1 May 29, 2008

(51) Int. Cl.
*H04J 3/04* (2006.01)
(52) U.S. Cl. ...................... 370/532; 709/238
(58) Field of Classification Search ............ 370/532, 370/536, 907, 389, 395.21; 709/231, 238
See application file for complete search history.

(56) References Cited

U.S. PATENT DOCUMENTS

| | | | |
|---|---|---|---|
| 7,356,052 B2 * | 4/2008 | Viks et al. ............... 370/532 |
| 7,379,939 B2 * | 5/2008 | Aggarwal et al. ............ 707/100 |
| 2001/0014936 A1 * | 8/2001 | Jinzaki ................. 711/221 |
| 2007/0043565 A1 * | 2/2007 | Aggarwal et al. ............ 704/245 |

OTHER PUBLICATIONS

Domingos et al., "Mining High-Speed Data Streams", in SIGKDD, pp. 71-80, Boston, MA 2000, ACM Press.
Hulten et al., "Mining Time-Changing Data Streams", in SIGKDD, pp. 97-106, San Francisco, CA, 2001, ACM Press.
Shafer et al., "Sprint: A Scalable Parallel Classifier for Data Mining", 22$^{nd}$ VLDB Conference, Bombay India 1996, pp. 1-12.
Wang et al., "Mining Concept-Drifting Data Streams Using Ensemble Classifiers", in SIGKDD, 2003, pp. 1-12.

* cited by examiner

*Primary Examiner*—Dang T Ton
*Assistant Examiner*—Nourali Mansoury
(74) *Attorney, Agent, or Firm*—Yee & Associates, P.C.; Preston J. Young

(57) ABSTRACT

A computer implemented method, system, and computer usable program code for classifying a data stream using high-order models. The data stream is divided into a plurality of data segments. A classifier is selected for each of the plurality of data segments. Each of a plurality of classifiers is clustered into states. A state transition matrix is computed for the states. The states of the state transition matrix specify one of the high-order models for classifying the data stream.

17 Claims, 3 Drawing Sheets

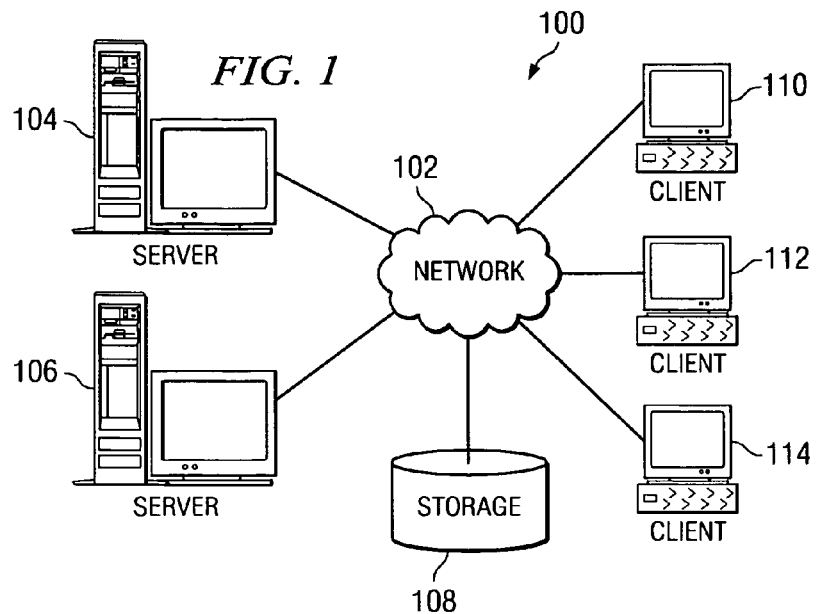

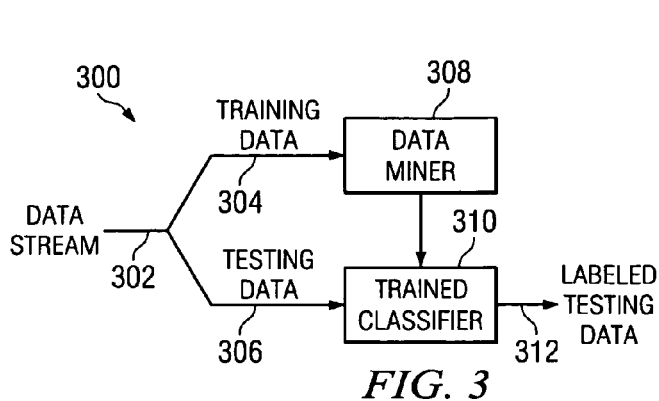
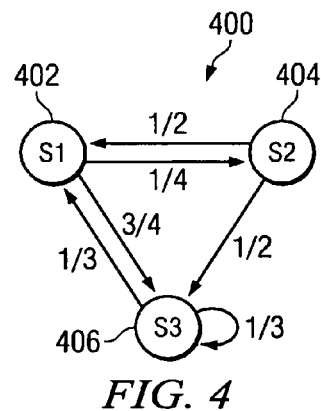
FIG. 3
FIG. 4
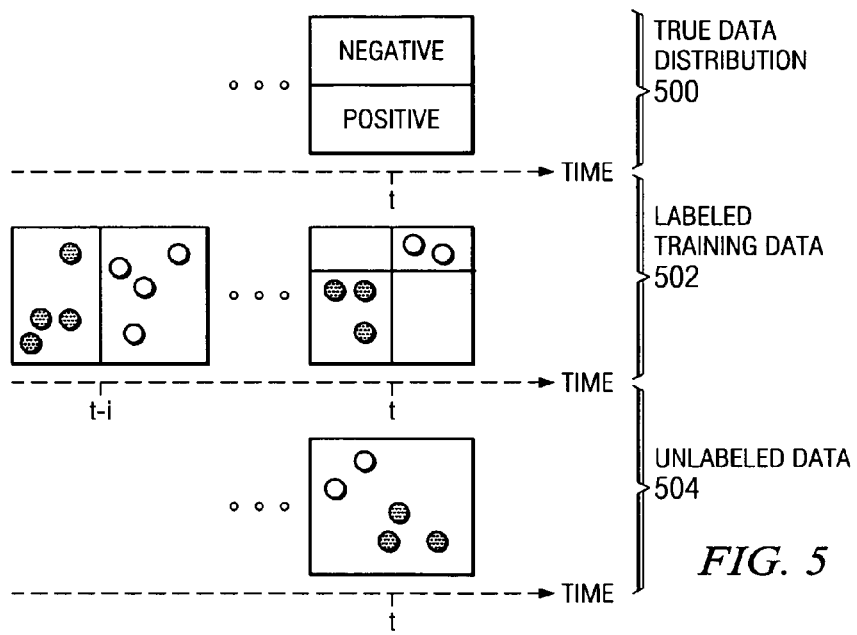
FIG. 5
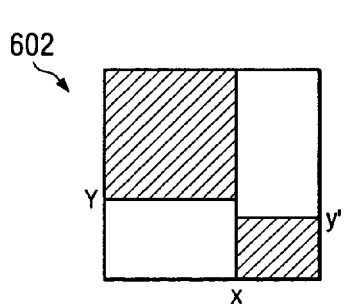
FIG. 6a
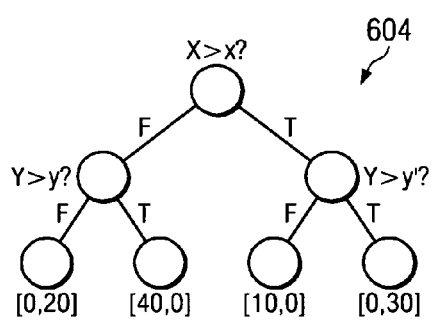
FIG. 6b

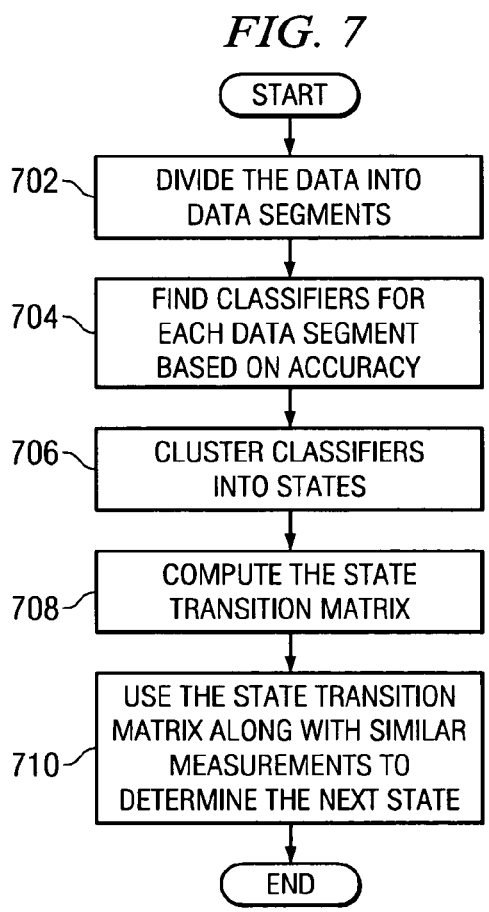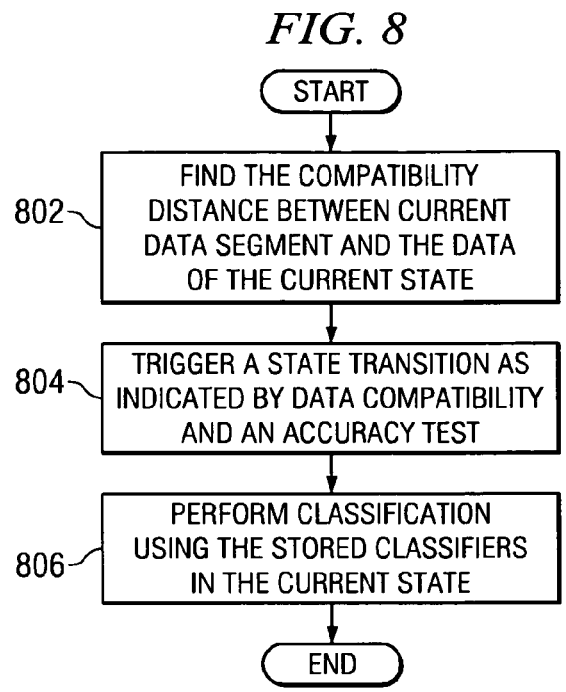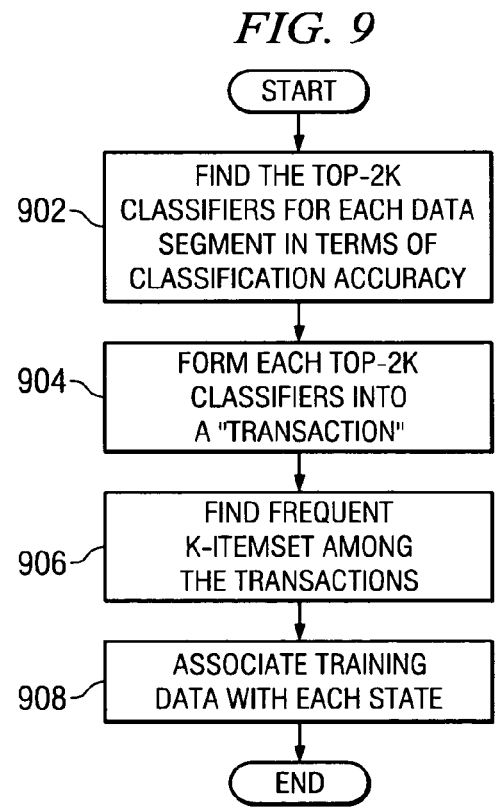

SYSTEM AND METHOD FOR CLASSIFYING DATA STREAMS USING HIGH-ORDER MODELS

BACKGROUND OF THE INVENTION

1. Field of the Invention

The present invention relates generally to an improved data processing system, and in particular, to a computer implemented method and system for processing data streams. Still more particularly, the present invention relates to a computer implemented method, system, and computer usable program code for classifying data streams using high-order models.

2. Description of the Related Art

Stream processing computing applications are applications in which the data comes into the system in the form of information flow, satisfying some restriction on the data. With this type of data, the volume of data being processed may be too large to be stored; therefore, the information flow calls for sophisticated real-time processing over dynamic data streams, such as sensor data analysis and network traffic monitoring. Examples of stream processing computing applications include video processing, audio processing, streaming databases, and sensor networks.

Classifying data streams is extremely important for various practical purposes. For example, data streams need to be classified in order to detect credit card fraud and network intrusions. Classifying data streams is difficult because of the large volume of data coming into a system at very high speeds. Additionally, data distribution within the data streams is constantly time-changing.

Classification plays an important role in filtering out uninteresting patterns or those that are irrelevant to the current classification scheme. Often, classifiers may compete with other processing elements for resources, such as processing power, memory, and bandwidth. Some current solutions incrementally update classifiers using models. These models are referred to as decision trees and are repeatedly revised so that the decision tree always represents the current data distribution. Decision trees are unstable data structures. As a result, a slight drift or concept shift may trigger substantial changes. Concept drift is defined as changes in underlying class distribution over time. For example, in a classification system for fraud detection, transactions may be classified into two classes: fraudulent or normal. As the spending pattern of a credit card user evolves over time, the set of transactions that are classified to be normal and fraudulent should also be changing.

In another solution, stream processing applications repeatedly learn new independent models from streaming data to grow and remove new sub-trees. Decision trees with the highest classification accuracy are selected based on new data arriving. Learning costs associated with removing and growing decision trees are very high and accuracy is low. Low accuracy may result from model overfitting due to lack of training data or conflicts of concepts due to abundance of training data.

Ensemble classifiers may also be used to partition data streams into fixed size data segments. Ensemble classifiers have high costs because the classifiers are learned for each new segment. Furthermore, every classifier is evaluated for each test example. The classifiers are homogeneous and discarded as a whole. As a result, current classification process for data streams are time consuming and unable to effectively process high-speed data streams with changing data distributions.

SUMMARY OF THE INVENTION

The illustrative embodiments provide a computer implemented method, system, and computer usable program code for classifying a data stream using high-order models. The data stream is divided into a plurality of data segments. A classifier is selected for each of the plurality of data segments. Each of a plurality of classifiers is clustered into states. A state transition matrix is computed for the states. The states of the state transition matrix specify one of the high-order models for classifying the data stream.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the illustrative embodiments may be implemented;

FIG. 2 is a block diagram of a data processing system in which the illustrative embodiments may be implemented;

FIG. 3 is a classification system in accordance with the illustrative embodiments;

FIG. 4 is a state transition diagram in accordance with the illustrative embodiments;

FIG. 5 is a diagram illustrating random dataset partitioning in accordance with the illustrative embodiments;

FIGS. 6A-6B are diagrams illustrating data distributions in accordance with the illustrative embodiments;

FIG. 7 is a flowchart illustrating a process for classifying data streams in accordance with the illustrative embodiments;

FIG. 8 is a flowchart of a process for finding a classifier for data segments in accordance with the illustrative embodiments; and FIG. 9 is a flowchart of a process for clustering classifiers into states in accordance with the illustrative embodiments.

DETAILED DESCRIPTION OF THE PREFERRED EMBODIMENT

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, system, and computer usable program code for classifying data streams using high-order models. A model describes the underlying class distribution, which is reflected by a trained classifier if the classification algorithm is correct. Because of concept drift, the underlying class distribution model changes over time. A high-order model describes how the underlying class distribution model changes over time. Although the underlying class distribution is changing, there is most likely a limited number of states, and the evolving nature of the data stream is embodied by the transitions among the different states.

The illustrative embodiments learn high-order patterns from historical models instead of repeatedly learning new models or revising old models. Even though the data distribution changes continuously, changes often follow a distribution. By learning the distribution, the illustrative embodiments switch from previous learned models instead of learning new models for the current data, thus, avoiding repeated training of classifiers from the new stream data.

For example, in a fraud detection application, the credit card spending habit of a user may exhibit seasonal patterns. That is, the credit card spending pattern of this summer is similar to that of last summer but is different from this spring which immediately precedes the spending pattern of this summer. The classifier that is trained with last summer's data is a historical classifier that captures the previously learned model. When the system of the illustrative embodiments detects that the model of last summer is accurate in classifying the data from this summer, the system switches to that model by using the classifier trained with the data from last summer rather than the current classifier that is trained with the data from this spring. Other common data streams may include network event logs, telephone call records, sensor and surveillance video streams, and other similar data. The illustrative embodiments learn from a sequence of historical trained classifiers instead of the data.

Turning now to FIG. 3, a classification system is depicted in accordance with the illustrative embodiments. Classification system 300 may be implemented using a single computing device, such as server 104 of FIG. 1 or may be implemented by a network of computing devices such as network data processing system 100 of FIG. 1. Classification system 300 classifies stream data 302. Classification system 300 learns from a sequence of historical trained models and historical data instead of the current data.

Classification system 300 receives data stream 302 as an input into classification system 300. Data stream 302 is a sequence of data items or tuples indexed by arrival time. Each data item becomes available once the data item arrives in data stream 302. For example, data stream 302, may contain data items $D1_{t1}, D1_{t2}, D1_{t3}, D1_{t4}, D1_{t5}, D1_{t6}, D1_{t7}, D1_{t8}$, and $D1_{t9}$ in which t1, t2, . . . , t9 is the time each data item becomes available from data stream 302. A data item is a data point in the set of data to be analyzed. A data item may have several attributes. In the fraud detection example, a data item may be a credit card transaction. The data item has several attributes that range from the amount of money that is spent, where the money is spent, and when the money is spent. Based on these attributes, classification system 300 classifies each transaction into the normal or fraud class.

Data stream 302 is divided into segments. In other words, data stream 302 is divided into many time windows W1, W2, W3, . . . , Wn. All data within a time window is grouped into a data segment. Each data segment within data stream 302 contains both the training data and the test data. Data within data stream 302 causes classification system 300 to be in one of a set of states. A state corresponds to a model. Each state captures an underlying class distribution. Within each state, class distributions are stable. Furthermore, the classifiers for each stable state are already available because they were previously learned. Transitions between states may occur at any time. When the distribution changes to another distribution, classification system 300 moves to another state.

For example, a data processing system may normally operate in a stable state. When certain events occur, such as memory usage exceeding the physical memory threshold, the system goes into another state that may involve more paging operations which takes more processing and disk input/output time. The state of the system may switch back again when memory usage recedes.

Data stream 302 is split into training data 304 and testing data 306. For example, $D1_{t3}$ and $D1_{t5}$, may be split to form training data 304 with the rest of data stream is designated as testing data 306. When data stream 302 comes into classification system 300, some of the data in data stream 302, whose labels are known, is selected as training data 304. A model is learned from training data 304 and used to classify testing data 306.

A user may examine training data 304 to assign a class label. A class label is a label on a data item to indicate which class the data belongs to. The class label is a prediction or identification of the data item. For example, in a credit card fraud detection application, each credit card transaction may be a data item. Such a data item may contain attributes, such as the amount of money spent and the location of the transaction. The class label may indicate whether this transaction is a fraud transaction or legitimate transaction.

In another example, classification system 300 may be used to classify a set of people with respect to a particular type of product. Each customer may have many attributes, such as income, age, place of residence, gender, and hobbies. Classification system 300 may classify each customer into two classes: the class that uses the type of products and the class that does not use the type of products.

Training data 304 is fed into data miner 308 for data mining. Data items are analyzed by data miner 308. Data mining is the process of automatically searching large volumes of data for patterns. Data mining uses computational techniques from statistics, information retrieval, machine learning, and pattern recognition. Data mining may be further defined as the nontrivial extraction of implicit, previously unknown, and potentially useful information from data. Data miner 308 extracts patterns and rules on class label assignments from training data 304 for trained classifier 310 to apply them to testing data 306. Data miner 308 allows users to analyze data, show patterns, sort data, determine relationships, and generate statistics. Particularly, data miner 308 reveals the states as well as the state transition mechanisms in a system. The state transition mechanisms are the factors or attributes that cause the system to transition from one state to another.

Data miner 308 outputs trained classifier 310. Trained classifier 310 is a program that receives an input in the form of a set of data and outputs the class label of each data item in the form of labeled testing data 312. Trained classifier 310 is a classifier output after classification system 300 analyzes training data 304 which are labeled. Trained classifier 310 is used to classify testing data 306 which are unlabeled. Classification system 300, uses a high-level model to construct a model that best describes the current underlying class distribution for accurate classification.

Trained classifier 310 receives testing data 306 as an input and assigns the designated label to testing data 306 to form labeled testing data 312. Ideally, data miner 308 will produce trained classifier 310 which assigns the labels to testing data 306 similar to the way the class label is assigned to training data 304.

Training data 304 is unlabeled data input to a trained classifier for classification and may contain data items with multiple attributes. Trained classifier 310 is a data structure that may have been previously accessed, established, or modified for each stable state. As a result, trained classifiers produced by data miner 308 may be reused. Typically, a system monitored by classification system 300 works in one stable state. When certain conditions or events occur, classification system 300 may go into another state. For example, a system operating in a normal state may move to a low memory state when memory usage exceeds a physical memory threshold. When the memory usage recedes, the system may return to the normal state.

FIG. 4 is a state transition diagram in accordance with the illustrative embodiments. FIG. 4 describes one way to implement aspects of data miner 308 of FIG. 3. The illustrative embodiments compare data distributions to predict transitions from one state to the next. For example, assume the previous state is $S_i$ and the current training dataset is D. The problem is to determine what the next state is. In other words, which set of classifiers should be used to classify the next testing dataset. The testing dataset may be testing data 306 of FIG. 3.

State transition diagram 400 is a graph whose nodes are states and whose edges are transitional probabilities between the states captured by the nodes that the edge is connected to.

State transition diagram 400 illustrates the high-order model and transitions between nodes S1 402, S2 404, and S3 406. Each node captures an underlying probability distribution. When the distribution changes to another distribution, a state transition also occurs.

State transition diagram 400 represents the probabilistic transition from one state to another state. Each node of state transition diagram 400 is a classifier which is best suited to classify a data segment in a specified time window. A classifier is used to classify unlabeled testing data. For example, nodes S1 402, S2 404, and S3 406 may be a classifier, such as trained classifier 310 of FIG. 3. Each node in FIG. 4 represents a state or a model describing the current class distribution, which may be captured by a trained classifier or a combination of a set of classifiers.

For example, assume a system is in state $S_i$ which has the corresponding data set $S_i^d$. The next state may be $S_j$ with probability $P_{ij}$. The illustrative embodiments use classification of higher-order models to find compatibility between D and $S_i^d$. Compatibility distance measures how similar two models are. Compatibility is used in the illustrative embodiments to measure the similarity between a model suggested by the state transition diagram and the model that best captures the current training data. There are many ways to perform an accuracy test. In general, for a training set D and classifier C, C is used to classify every data item in D and measure the number of misclassification where the class label output by C is different from the class label of the data item.

The edges, shown as arrows, are the transactions from one state to another. The sum of out-edges from a node is 1. State transitions may occur because of any number of factors, attributes, events, or other circumstances. In one illustrative embodiment, a high-order model includes many states. For example, sales at a retail store may vary year round. One of the reasons that sales may vary is the season. For example, individuals may buy more shorts in the summer and more pants in the winter because of the temperatures associated with the season. The season may be an attribute for defining states in a sales classification system.

In another example, states may define the status of a computing device. Factors, such as memory, device drivers, hardware conflicts, and obsoleteness may all contribute to the state of the computing device. Learning all possible attributes or factors is impossible because they are infinite. The illustrative embodiments use model training for establishing states based on historic data because in many cases the appropriate state may be reflected by the underlying data distribution. Historic data is data received and processed in the past. For example, historic data may be data received in data stream 302 of FIG. 3 for a prior time period.

Model training establishes group models for states in state transition diagram 400. The models may be learned using traditional ensemble-based stream classifiers. A classifier ensemble is a combination of a set of classifiers. The simple way to combine them is to combine them linearly with a weight for the output of each classifier.

Model training establishes a time-based accuracy threshold for each model. Accuracy describes how accurate a classifier can be in classifying a set of data. There are many ways to perform an accuracy test. In general, for a training set D and classifier C, C is used to classify every data item in D and measure the number of misclassification where the class label output by C is different from the class label of the data item. The accuracy threshold may be the maximum percentage of misclassification that is allowed, such as 2%.

State transition diagram 400 may also be represented by a matrix representation referred to as a transition matrix. Each row of the matrix represents the start state and each column of the matrix represents the end state. Thus, an entry Aij in the matrix represents the transitional probability from state i to state j. The transition matrix is learned from historical concepts and models. The transition matrix details the next possible states in the same ways as state transition diagram 400. As a result, current data distributions may be more easily classified to a certain state making transitions more enforceable.

Turning now to FIG. 5, a diagram illustrating random dataset partitioning in accordance with the illustrative embodiments. Random dataset partitioning is further described in step 704 of FIG. 7 and FIG. 8. True data distribution 500 is a distribution that may be found in any data stream. Labeled training data 502 may be training data 304 of FIG. 3. Unlabeled data 504 is data to be classified, such as testing data 306 of FIG. 3.

FIGS. 6A-6B are diagrams illustrating data distributions in accordance with the illustrative embodiments. Multi-dimensional space 602 is a randomly partitioned dataset. Multi-dimensional space 602 is partitioned into a set of disjoint K subspaces. Signature or class distribution 604 is created based on multi-dimensional space 602 as randomly partitioned. A signature distance is computed based on the class distribution. The signature distance is used to measure the compatibility of two models and is further described in FIG. 8.

$$Dist_s(a, b) = \frac{1}{2} \sum_{j=1}^{n} \sum_{k=1}^{c} \left| \frac{n_{a,j,k}}{N_a} - \frac{n_{b,j,k}}{N_b} \right|$$

FIG. 7 is a flowchart illustrating a process for classifying data streams in accordance with the illustrative embodiments. The process of FIG. 7 may be implemented by a classification system, such as classification system 300 of FIG. 3. The process begins by dividing the data into data segments (step 702). The data segments are preferably of fixed size. For example, the segments may be numbered $D_1 \ldots D_n$.

Next, the process finds a classifier for each data segment based on accuracy (step 704). The classifier may be found by a data mining application, such as data miner 308 of FIG. 3. The classifier may be a 2-k classifier. A top 2-k classifier is the top 2-k classifier in $L_i$ in terms of accuracy. In step 704, the process may learn a classifier $C_i$ for each data segment $D_i$.

During step 704, the process may find a set of classifiers whose classification accuracy is among the top-2k. Every top-2k classifier is grouped to form a transaction. The process may mine k-frequent itemsets in the transactions. Each k-frequent itemset corresponds to a state S. The data that corresponds to state S is $S_d = [D_i$, where $C_i \in S$.

Next, the process clusters classifiers into states (step 706). During step 706, the process finds k classifiers that frequently appear together and groups the classifiers into states.

Next, the process computes the state transition matrix (step 708). For the given historical data sequence $D_1, D_2, \ldots, D_i, \ldots$ the corresponding state sequence $S_i, S_2, \ldots, S_i, \ldots$ is found in step 706. In step 708, the process counts the cases when state $S_i$ is followed by state $S_j$ in the sequence. A two-dimensional array A, the state transition matrix is used to store the counts. $A[_{i,j}]$ is the number of cases when state $S_i$ is followed by state $S_j$. The probably of state transition from $S_i$ to $S_j$ is thus, $$P_{i,j} = \frac{A[i,j]}{|S_i|}.$$

Next, the process uses the state transition matrix along with similar measurements to determine the next state (step 710), with the process terminating thereafter. By determining the next state in step 710, the process may be ready to transition to another data distribution model for effective stream processing.

FIG. 8 is a flowchart of a process for finding a classifier for data segments in accordance with the illustrative embodiments. The process of FIG. 8 is a more detailed explanation of step 704 of FIG. 7. The process begins by finding the compatibility distance between the current data segment and the data of the current state (step 802).

The assumption is made that the previous state is $S_i$ and the current training dataset is D. The problem is to determine the next state or which set of classifiers should be used to classify the next testing dataset. The next state may be $S_j$ with probability $P_{ij}$. In one embodiment, the process may choose the state that has the highest transition probability from the current state as the next state. Accuracy may be improved by using the current training dataset D.

In step 802, the process compares the compatibility of the dataset D and $S_{j,d}$ for each potential next state $S_j$. Let sim(D,j) be the similarity measurement between D and $S_{j,d}$. The likelihood of the next state $S_j$ is computed as $w_j = a \cdot sim(D,j) + b \cdot P_{i,j}$ where a and b are weights of the current data similarity and the transition probability. The value of a and b control whether more emphasis is placed on the current data or on the historical data.

The following describes the definition of the similarity function $sim(d_a, d_b)$, which measures the "compatibility" of class distributions of two datasets $d_1$ and $d_2$ used in step 802:

1. Assuming each record in $d_a$ and $d_b$ is in the form of (x,c) where x is a vector is a multi-dimensional space V and c is the class of x.
2. Randomly partition the multi-dimensional spave V into a set of disjoint K subspaces.
3. Let $n_{a,j,c}$ be the number of records (x,c) in dataset $d_a$, such that x falls into subspace j, and let $n_{b,j,c}$ be the number of records (x,c) in dataset $d_b$ such that x falls into subspace j.
4. $s_1(d_a, d_b)$ is computed as:

$$s_i(d_a d_b) = \frac{1}{2} \sum_{j=1}^{K} \sum_{c=1}^{C} \left| \frac{n_{a,j,c}}{N_a} - \frac{n_{b,j,c}}{N_b} \right|$$

Where $N_a$ and $N_b$ are the number of records in $d_a$ and $d_b$ respectively.
5. Repeat step 2, 3, 4 to get new similarity measures $s_1$, $s_2$, ..., $s_m$ using different random partitions.
6.

$$\text{Return } sim(d_a, d_b) = \frac{1}{m} \sum_{i=1}^{m} s_i.$$

Next, the process triggers a state transition as indicated by data compatibility and an accuracy test (step 804). Next, the process performs classification using the stored classifiers in the current state (step 806), with the process terminating thereafter.

FIG. 9 is a flowchart of a process for clustering classifiers into states in accordance with the illustrative embodiments. The process of FIG. 9 is a more detailed explanation of step 706 of FIG. 7. The process begins by finding the top-2k classifiers for each data segment in terms of classification accuracy (step 902). In step 902, the process finds a set of classifiers that have high accuracy for each segment $D_i$. More specifically, each classifier $C_j$, $1 \leq j \leq n$ on each data chunk $D_i$. The process also obtains the accuracy of $C_j$. A data segment $D_i$, now corresponds to a sequence $L_i$ of base classifiers ordered by decreasing accuracies.

Next, the process forms each top-2k classifier into a transaction (step 904). In step 904, the process finds the top-2k classifiers for each segment $D_i$. The top-2k classifiers are the first 2k classifiers in $L_i$ where k<<n. In terms of market-basket analysis, the top-2k classifiers form a "transaction", and each "item" in the "transaction" is a classifier.

Next, the process finds frequent k-itemset among the transactions (step 906). In step 906, the process finds the classifiers that frequently appear together in top-2k sets. These classifiers may correspond to a state. For example, the process may use the A-Priori algorithm for market basket analysis to mine k-frequent itemsets in the transactions in step 906. The result is a set of frequent itemsets S={S1, S2, ....,} where each $S_i$ is a set of at least k classifiers, and the frequency of $S_i$ is above a threshold.

Next, the process associates training data with each state (step 908), with the process terminating thereafter. Each k-frequent itemset $S_i$ corresponds to a state in which the state is denoted by $S_i$. The data that corresponds to state $S_i$ is denoted as $S_{i,d}$ and $S_{i,d} = \cup_i D_i$, where $C_i \in S_i$.

Thus, the illustrative embodiments provide a computer implemented method, system, and computer usable program code for classifying data streams using high-order models. A data stream is processed using learned models instead of relearning models for each changing data stream. As a result, data streams are more effectively classified and processed using existing models in the form of classifiers. As a result, the illustrative embodiments improve efficiency of training and classification despite continuously changing data and concept drifts.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or non-transitory, tangible computer readable storage medium providing program code for use by or in connection with a computer or any instruction execution system. For the purposes of this description, a computer-usable or computer readable medium can be any tangible apparatus that can contain or store the program for use by or in connection with the instruction execution system, apparatus, or device Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact-disk read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for classifying a data stream using high-order models based on an underlying class distribution, the computer implemented method comprising:
   dividing the data stream into a plurality of data segments using a processor, and wherein the data segments are divided into training data and testing data, wherein the training data is used to determine one of a set of states, wherein the dividing step is performed on a data processing system;
   learning a classifier for each data segment in the training data using a data mining application on the data processing system, wherein learning the classifier for the each data segment in the training data further comprises:
      finding a top two classifiers in terms of classification accuracy for each of the plurality of data segments;
      forming each of the top two classifiers into a set of transactions; and
         using the data mining application to find all k-frequent itemsets in the set of transactions, wherein each k-frequent itemset corresponds to a set of classifiers
   clustering the set of classifiers into the set of states;
   computing a probability of a first state transitioning to a second state from the set of states using a formula $$P_{i,j} = \frac{A[i, j]}{|S_i|},$$

wherein the probability is known as $P_{i,j}$, and wherein using the formula $$P_{i,j} = \frac{A[i, j]}{|S_i|}$$

further comprises:
   counting a number of cases where a first state known as $S_i$ is followed by state $S_j$ in a state sequence, wherein the state sequence corresponds to a given historical data sequence; and
   storing the number of the cases when the first state known as $S_i$ is followed by state $S_j$ in a two dimensional array, wherein the two dimensional array is known as A[i,j];
creating a state transition diagram, wherein the state transition diagram is a high order model corresponding to the set of states, wherein the set of states capture the underlying class distribution, wherein the state transition diagram represents a probabilistic transition of data in the data stream from one state to another state from among the set of states, wherein the state transition diagram is comprised of nodes, wherein the state transition diagram further comprises connecting edges between each node, wherein the connecting edges are transitional probabilities between the set of states, wherein the transitional probabilities are calculated using the formula $$P_{i,j} = \frac{A[i, j]}{|S_i|}; \text{ and}$$

using the state transition diagram to classify the testing data from the data stream into corresponding states from the set of states.

2. The computer implemented method of claim 1, wherein the using step further comprises:
   measuring a compatibility distance Dist between the testing data a and each potential next state b, wherein the measuring step is performed using a formula $$Dist_s(a, b) = \frac{1}{2}\sum_{j=1}^{n}\sum_{k=1}^{c}\left|\frac{n_{a,j,k}}{N_a} - \frac{n_{b,j,k}}{N_b}\right|, \text{ wherein } n_{a,j,k}$$

is a first number of records (x,c) in a dataset $d_a$ such that x falls into a subspace j, and wherein $n_{b,j,k}$ is a second number of records (x,c) in a dataset $d_b$ such that the x falls into the subspace j, wherein the x is a vector in a multi-dimensional space and the c is a class of the x, wherein $N_a$ is a third number of records in the dataset $d_a$, and wherein $N_b$ is a third number of records in the dataset $d_b$.

3. The computer implemented method of claim 1, further comprising
   establishing a time-based accuracy threshold for each model in the state transition diagram.

4. The computer implemented method of claim 3, further comprising:
   determining the time-based accuracy threshold for the each model, wherein the accuracy threshold is a maximum percentage of allowable misclassifications, wherein a misclassification occurs when a class label output by a classifier is different from the class label of a data item.

5. The computer implemented method of claim 1, further comprising:

receiving a class label for the training data, wherein the class label is a label on the data item to indicate which class the data belongs to.

6. The computer implemented method of claim 1, wherein the data mining application reveals the set of states and state transition mechanisms located in the data stream, wherein the state transition mechanisms are factors that cause a shift in the data stream from the one state to the another state.

7. The computer implemented method of claim 1, further comprising:
learning a state transition matrix based on the state transition diagram, wherein the state transition diagram is represented by the transition matrix, wherein the transition matrix is composed of rows representing start states, columns representing end states and entries representing transitional probability from the one state to the another state.

8. The computer implemented method of claim 1, wherein random dataset partitioning further comprises:
partitioning a randomly partitioned multi-dimensional space dataset into a set of disjoint subspaces;
creating signature distribution based on the randomly partitioned multi-dimensional space dataset;
computing a compatibility distance between a current data segment and a data of a current data of a current state to each potential state with high transition probability;
triggering a state transition from the current state to a state that has a highest transition probability from the current state as indicated by data compatibility and an accuracy test; and
using the set of classifiers in the current state to select a classifier.

9. The computer implemented method of claim 1, further comprising:
grouping all data in the data stream within a time window into a data segment, wherein the each data segment contains both labeled training data and unlabeled testing data.

10. A data processing system for classifying a data stream using high-order models based on an underlying class distribution, the data processing system comprising:
a bus system;
a communications system connected to the bus system;
a memory connected to the bus system, wherein the memory includes a set of instructions; and
a processing unit connected to the bus system, wherein the processing unit executes the set of instructions to divide the data stream into a plurality of data segments, and wherein the data segments are divided into training data and testing data, wherein the training data is used to determine one of a set of states, wherein the dividing step is performed on the data processing system; to learn a classifier for each data segment in the training data using a data mining application on the data processing system, wherein learning the classifier for the each data segment in the training data further comprises: finding a top two classifiers in terms of classification accuracy for each of the plurality of data segments; forming each of the top two classifiers into a set of transactions; and using the data mining application to find all k-frequent itemsets in the set of transactions, wherein each k-frequent itemset corresponds to a set of classifiers; clustering the set of classifiers into the set of states; computing a probability of a first state transition to a second state from the set of states using a formula $$P_{i,j} = \frac{A[i, j]}{|S_i|},$$

wherein the probability is known as $P_{i,j}$, and wherein using the formula $$P_{i,j} = \frac{A[i, j]}{|S_i|}$$

further comprises: counting a number of cases wherein a first state known as $S_i$ is followed by state $S_j$ in a state sequence, wherein the state sequence corresponds to a given historical data sequence; and storing the number of the cases when the first state known as $S_i$ is followed by state $S_j$ in a two dimensional array, wherein the two dimensional array is known as A[i,j]; to create a state transition diagram, wherein the state transition diagram is a high order model corresponding to the set of states, wherein the set of states capture the underlying class distribution, wherein the state transition diagram represents a probabilistic transition of data in the data stream from one state to another state from among the set of states, wherein the state transition diagram is comprised of nodes, wherein the state transition diagram further comprises connecting edges between each node, wherein the connecting edges are transitional probabilities between the set of states, wherein the transitional probabilities are calculated using the formula $$P_{i,j} = \frac{A[i, j]}{|S_i|};$$

and to use the state transition diagram to classify the testing data from the data stream into corresponding states from the set of states.

11. The data processing system of claim 10, wherein the using step further comprises:
measuring a compatibility distance Dist between the testing data a and each potential next state b, wherein the measuring step is performed using a formula $$Dist_s(a, b) = \frac{1}{2} \sum_{j=1}^{n} \sum_{k=1}^{c} \left| \frac{n_{a,j,k}}{N_a} - \frac{n_{b,j,k}}{N_b} \right|, \text{ wherein } n_{a,j,k}$$

is a first number of records (x,c) in a dataset $d_a$ such that x falls into a subspace j, and wherein $n_{b,j,k}$ is a second number of records (x,c) in a dataset $d_b$ such that the x falls into the subspace j, wherein the x is a vector in a multi-dimensional space and the c is a class of the x, wherein $N_a$ is a third number of records in the dataset $d_a$, and wherein $N_b$ is a third number of records in the dataset $d_b$.

12. The data processing system of claim 10, further comprising:
establishing a time-based accuracy threshold for each model in the state transition diagram.

13. A computer program product stored on a non-transitory, tangible computer readable storage medium including computer usable program code for classifying a data stream using high-order models based on an underlying class distribution, the computer program product comprising:

computer usable program code, stored on the computer readable storage medium, for dividing the data stream into a plurality of data segments, and wherein the data segments are divided into training data and testing data, wherein the training data is used to determine one of a set of states, wherein the dividing step is performed on a data processing system;

computer usable program code, stored on the computer readable storage medium, for learning a classifier for each data segment in the training data using a data mining application on the data processing system, wherein learning the classifier for each data segment in the training data further comprises:

computer useable program code, stored on the computer readable storage medium for finding a top two classifiers in terms of classification accuracy for each of the plurality of data segments;

computer useable program code, stored on the computer readable storage medium for forming each of the top two classifiers into a set of transactions; and computer useable program code, stored on the computer readable storage medium for using the data mining application to find all k-frequent itemsets in the set of transactions, wherein each k-frequent itemset corresponds to a set of classifiers;

computer usable program code, stored on the computer readable storage medium, for clustering the set of classifiers into the set of states; computer useable program code for computing a probability of a first state transitioning to a second state from the set of states using a formula $$P_{i,j} = \frac{A[i, j]}{|S_i|},$$

wherein the probability is known as $P_{i,j}$, and wherein using the formula $$P_{i,j} = \frac{A[i, j]}{|S_i|}$$

further comprises:

computer useable program code, stored on the computer readable storage medium for counting a number of cases where a first state known as $S_i$ is followed by state $S_j$ in a state sequence, wherein the state sequence corresponds to a given historical data sequence; and computer useable program code, stored on the computer readable storage medium for storing the number of the cases when the first state known as $S_i$ is followed by state $S_j$ in a two dimensional array, wherein the two dimensional array is known as A[i,j];

computer useable program code, stored on the computer readable storage medium, for creating a state transition diagram, wherein the state transition diagram is a high order model corresponding to the set of states, wherein the set of states capture the underlying class distribution, wherein the state transition diagram represents a probabilistic transition of data in the data stream from one state to another state from among the set of states, wherein the state transition diagram is comprised of nodes, wherein the state transition diagram further comprises connecting edges between each node, wherein the connecting edges are transitional probabilities between the set of states, wherein the transitional probabilities are calculated using the formula $$P_{i,j} = \frac{A[i, j]}{|S_i|}; \text{ and}$$

computer useable program code, stored on the computer readable storage medium, for using the state transition diagram to classify the testing data from the data stream into corresponding states from the set of states.

14. The computer program product of claim 13, wherein the using step further comprises:

measuring a compatibility distance Dist between the testing data a and each potential next state b wherein the measuring step is performed using a formula $$Dist_s(a, b) = \frac{1}{2} \sum_{j=1}^{n} \sum_{k=1}^{c} \left| \frac{n_{a,j,k}}{N_a} - \frac{n_{b,j,k}}{N_b} \right|, \text{ wherein } n_{a,j,k}$$

is a first number of records (x,c) in a dataset $d_a$ such that x falls into a subspace j, and wherein $n_{b,j,k}$ is a second number of records (x,c) in a dataset $d_b$ such that the x falls into the subspace j, wherein the x is a vector in a multi-dimensional space and the c is a class of the x, wherein $N_a$ is a third number of records in the dataset $d_a$, and wherein $N_b$ is a third number of records in the dataset $d_b$.

15. The computer program product of claim 13, further comprising computer useable program code, stored on the computer readable storage medium, for establishing a time-based accuracy threshold for each model in the state transition diagram.

16. The computer program product of claim 13, further comprising computer useable program code, stored on the computer readable storage medium, for determining a time-based accuracy threshold for each model, wherein the accuracy threshold is a maximum percentage of allowable misclassifications, wherein a misclassification occurs when a class label output by a classifier is different from the class label of a data item.

17. The computer program product of claim 13, further comprising receiving a class label for the training data, wherein the class label is a label on the data item to indicate which class the data belongs to.

* * * * *